Patented Apr. 9, 1935

1,996,867

UNITED STATES PATENT OFFICE 1,996,867

DYESTUFFS OF THE THIAZINE SERIES

Richard Herz, Frankfort-on-the-Main, and Werner Zerweck and Wilhelm Hechtenberg, Frankfort-on-the-Main-Fechenheim, Germany, assignors to General Aniline Works, Inc., New York, N. Y., a corporation of Delaware No Drawing. Application October 27, 1932, Serial No. 639,928. In Germany November 4, 1931

5 Claims. (Cl. 260—27)

Our present invention relates to dyestuffs of the thiazine series described in U. S. Patent 1,588,384.

In said patent and British Patent No. 265,641 quinone vat dyestuffs are described, which correspond to the general formula:

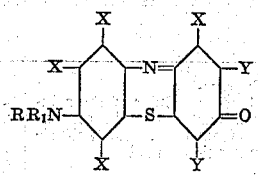

in which $R_1$ indicates aryl, R hydrogen, alkyl or aralkyl, X hydrogen or a monovalent substituent and Y hydrogen or a monovalent substituent, particularly halogen (chlorine), which dyestuffs dye particularly animal fibers in the vat and are capable in a surprising manner of being fixed on vegetable fibers according to the methods usual for dyestuffs containing sulfur.

However, in the case of some members of this series of dyestuffs, namely of such dyestuffs, in the molecule of which the attached aryl-radicle signified by $R_1$ in the above formula, is a higher molecular complex (i. e. contains several substituents or more than one benzene nucleus), often some difficulties arise when the dyestuffs are applied for machine dyeing in apparatus or dyeing in the piece. These difficulties may be involved owing to the fact that these dyestuffs incline to separate from the dye-bath in a crystalline form so that uneven dyeings may easily be obtained.

In accordance with our present invention this disadvantage can be entirely corrected and derivatives of the quinone vat dyestuffs of the aforesaid type are obtainable, which are easily soluble in the sodium sulfide bath at all practical concentrations and temperatures when into the molecule of the said dyestuffs is introduced the group —$SO_2$—NH—, either the sulfur or the nitrogen atom of this group being attached to the aforesaid aryl-radicle signified by $R_1$.

The new dyestuffs correspond probably to the general formula:

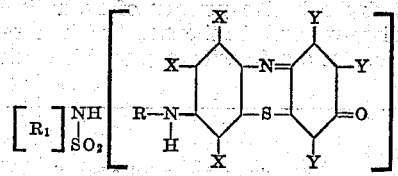

wherein R and $R_1$ indicate an aryl radicle of the benzene, diphenyl or naphthalene series, X hydrogen or a monovalent substituent and Y hydrogen or halogen.

It is a remarkable fact, that by the introduction of the group —$SO_2$—NH— the excellent affinity of the present dyestuff class for the vegetable fibers is not diminished. The dyeings obtained by means of the new derivatives are distinguished by a particular brightness of shade combined with fastness properties which are sufficient to satisfy practical demand. The present invention therefore constitutes an important technical advance.

The manufacture of the new derivatives of the quinone vat dyestuffs may be carried out for example from starting materials corresponding to those of U. S. Patent 1,588,384 and prepared by condensing the arylenethiazthionium chlorides with aromatic compounds containing in the molecule in addition to the primary or secondary amino group at least one —$SO_2$—NH— group.

In order to further illustrate our invention the following example is given, the parts being by weight; but it is understood that our invention is not limited to the particular products nor reacting conditions mentioned therein:

Example 52.6 parts of 3-methyl-5-(p'-phenylaminosulfo - diphenyl) - 2.1 - aminothiophenol of the probable formula:

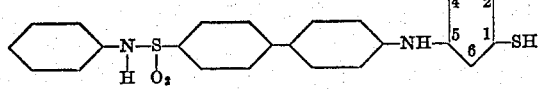

in the form of the moist zinc mercaptide are mixed with about ten times the quantity of alcohol and then about 30 parts of chloranil are added. The mixture, which slowly assumes a bluish coloration, is stirred for some hours at ordinary temperature and finally boiled for some hours. For removing the zinc the reaction mass is weakly acidified and the separated dyestuff is filtered off and washed. The dyestuff, which corresponds to the probable formula:

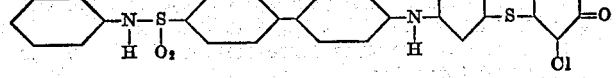

is when dry a bluish powder of metallic lustre which dissolves in nitrobenzene with a reddish blue, in sulfuric acid with a pure blue color.

It is easily soluble in the sodium sulfide bath from which cotton is dyed bright greenish blue shades.

The aminothiophenol compound employed as starting material may be prepared as follows:—

3-methyl-5-chloro- 1.2 -phenylenethiaz-thionium chloride is condensed with p-amino-diphenyl-p'-sulfanilide in the presence of glacial acetic acid according to U. S. Patent 1,588,384. The 3 - methyl - 5 - (p'-phenylamino - sulfo - diphenyl) - amino - 1.2 - phenylenethiaz-thionium chloride thus formed separates as a thick pulp of crystals of a metallic lustre, which are filtered off, washed with a dilute salt silution to which some hydrochloric acid has been added, and dried. This product is then transformed into the zinc mercaptide of the corresponding aminothiophenol by saponification and precipitating the solution with a zinc chloride solution according to U. S. Patent 1,588,384.

In the following table the behavior of some further dyestuffs of this series is described:—

| Dyestuff of the probable formula | Shade of the dyeings obtained on cotton with the dyestuff from the sodium sulfide bath | Color of the solution in concentrated sulfuric acid | Color of the solution in nitrobenzene |
|---|---|---|---|
| 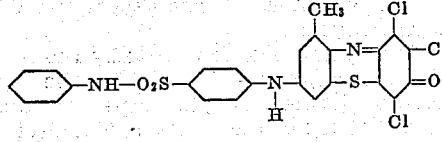 | Pure violet-blue. | Greenish-blue. | Blue when cold, violet when warm. |
| 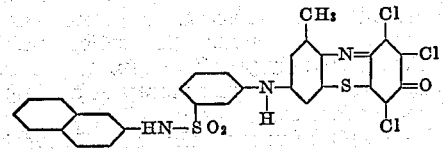 | Violet-blue. | Blue. | Blue when cold, reddish - violet when warm. |
| 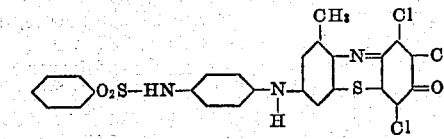 | Greenish-blue. | Blue. | Blue. |
| 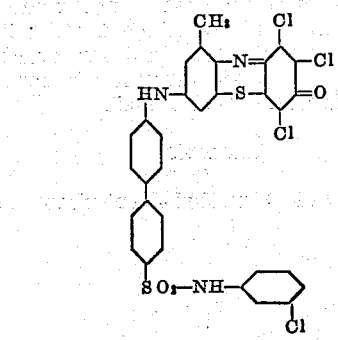 | Greenish-blue. | Blue. | Reddish-blue when warm. |

| Dyestuff of the probable formula | Shade of the dyeings obtained on cotton with the dyestuff from the sodium sulfide bath | Color of the solution in concentrated sulfuric acid | Color of the solution in nitrobenzene |
|---|---|---|---|
| (structure) | Greenish blue | Blue | Reddish blue when warm. |
| (structure) | Greenish blue | Blue | Reddish blue when warm. |
| (structure) | Greenish blue | Blue | Blue. |
| (structure) | Pure reddish blue | Blue | Violet when warm. |
| (structure) | Reddish blue | Blue | Blue when cold, violet when warm. |
| (structure) | Reddish blue | Blue | Blue. |

When starting for the production of the present dyestuffs from such ortho-amino-mercapto-compounds which contain in other positions, particularly in the other ortho-position of the amino group hydrogen or for instance an alkoxy group, similar dyestuffs are obtained, the shades of which are more reddish or greenish respectively according to the substituents.

We claim:

1. The dyestuffs of the thiazine series corresponding to the general formula:

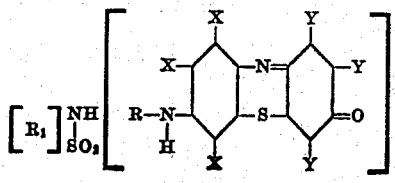

wherein R and R₁ indicate an aryl radicle of the benzene, diphenyl or naphthalene series at least one aryl radicle signified by R and R₁ belonging to the benzene series, X hydrogen or a methyl group and Y halogen, which dyestuffs dissolve in concentrated sulfuric acid with a blue color, which dyestuffs are easily soluble in the sodium sulfide bath and dye the vegetable fiber therefrom reddish to greenish blue shades of a particular brightness and a good fastness.

2. The dyestuffs of the thiazine series corresponding to the general formula:

$$R_1-SO_2-NH-R-N(H)-\text{(thiazine structure with X, Y substituents)}$$

wherein R and R₁ indicate an aryl radicle of the benzene, diphenyl or naphthalene series at least one aryl radicle signified by R and R₁ belonging to the benzene series, X hydrogen or a methyl group and Y halogen.

3. The dyestuff of the thiazine series corresponding to the formula:

$$\text{C}_6\text{H}_5-SO_2-NH-\text{(diphenyl)}-NH-\text{(thiazine with CH}_3\text{, Cl, Cl, Cl, =O)}$$

which dyestuff dissolves in concentrated sulfuric acid with a blue color, which dyestuff is easily soluble in the sodium sulfide bath and dyes cotton therefrom greenish blue shades of a particular brightness and a good fastness.

4. The dyestuff of the thiazine series corresponding to the formula:

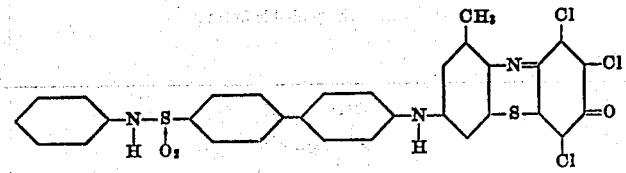

which dyestuff dissolves in concentrated sulfuric acid with a blue, in warm nitrobenzene with a reddish blue coloration, which dyestuff is soluble in the sodium sulfide bath and dyes cotton therefrom greenish blue shades of a particular brightness and of a good fastness.

5. The dyestuff of the thiazine series corresponding to the formula:

$$\text{Cl-C}_6\text{H}_4-SO_2-HN-\text{(diphenyl)}-NH-\text{(thiazine with CH}_3\text{, Cl, Cl, Cl, =O)}$$

which dyestuff dissolves in concentrated sulfuric acid and in nitrobenzene with a blue coloration, which dyestuff is soluble in the sodium sulfide bath and dyes cotton therefrom greenish blue shades of a particular brightness and of a good fastness.

RICHARD HERZ.
WERNER ZERWECK.
WILHELM HECHTENBERG.